United States Patent [19]

Dawkins

[11] Patent Number: 5,169,816

[45] Date of Patent: Dec. 8, 1992

[54] CHROMIUM CONTAINING COMPLEX POLYMERIZATION CATALYST

[75] Inventor: Gordon M. Dawkins, Beuvry, France

[73] Assignee: BP Chemicals Limited, London, England

[21] Appl. No.: 575,562

[22] Filed: Aug. 29, 1990

[30] Foreign Application Priority Data

Sep. 4, 1989 [GB] United Kingdom ............... 8919924

[51] Int. Cl.$^5$ .............................................. C08F 4/69
[52] U.S. Cl. .................... 502/152; 502/117; 526/129; 526/170; 526/118; 526/119
[58] Field of Search ............................... 502/152, 117

[56] References Cited

U.S. PATENT DOCUMENTS

| | | | |
|---|---|---|---|
| 3,666,743 | 5/1972 | Bower | 526/130 |
| 3,705,916 | 12/1972 | Bower | 526/130 |
| 3,752,795 | 8/1973 | Boone | 526/114 |
| 3,756,998 | 9/1973 | Kanapinka | 526/130 |
| 3,806,500 | 4/1974 | Karol | 526/130 |
| 3,836,595 | 9/1974 | Johnson et al. | 260/683.15 D |
| 3,840,508 | 10/1974 | Bollard et al. | 526/130 |
| 3,844,975 | 10/1974 | Karol | 526/130 |
| 3,847,957 | 11/1974 | Boone | 526/114 |
| 3,875,132 | 4/1975 | Kruse | 526/170 |
| 3,876,554 | 4/1975 | Pullukat | 252/428 |
| 3,879,368 | 4/1975 | Johnson | 502/117 X |
| 3,884,832 | 5/1975 | Pullukat et al. | 252/429 C |
| 3,926,782 | 12/1975 | Plank et al. | 208/135 |
| 3,928,304 | 12/1975 | Pullukat | 260/949.0 |
| 3,941,761 | 3/1976 | Pullukat et al. | 260/94.91 D |
| 3,976,632 | 8/1976 | Delap | 526/113 |
| 4,077,904 | 3/1978 | Noshay et al. | 502/152 |
| 4,086,408 | 4/1978 | Karol et al. | 502/152 X |
| 4,086,409 | 4/1978 | Karol et al. | 502/152 X |
| 4,147,849 | 4/1979 | Liu et al. | 526/113 |
| 4,153,576 | 5/1979 | Karol et al. | 502/152 |
| 4,303,770 | 12/1981 | Pullukat et al. | 526/96 |
| 4,359,562 | 11/1982 | Stein et al. | 526/129 |
| 4,435,314 | 3/1984 | van de Leemput et al. | 502/154 |
| 4,450,098 | 5/1984 | van de Leemput et al. | 502/107 |
| 4,458,028 | 7/1984 | van de Leemput et al. | 502/104 |
| 4,504,371 | 3/1985 | Cirjak et al. | 204/158 R |
| 4,587,227 | 5/1986 | Smith et al. | 502/153 |

FOREIGN PATENT DOCUMENTS

| | | |
|---|---|---|
| 26041 | 4/1981 | European Pat. Off. |
| 3030916 | 4/1982 | Fed. Rep. of Germany |
| 2193838 | 2/1974 | France |
| 1253063 | 11/1971 | United Kingdom |
| 1264393 | 2/1972 | United Kingdom |
| 1298220 | 11/1972 | United Kingdom |
| 1317734 | 5/1973 | United Kingdom |
| 1435273 | 5/1976 | United Kingdom |

OTHER PUBLICATIONS

B. L. Shapiro (ed) 'Organometallic Compounds' 1983 Texas A & M Univ., pp. 493–499, paper by R. T. Edidism et al., "The Synthesis, Structure and Reaction of Dinuclear Compounds Containing Early and Lots Transactions Metals".

Madach et al., Chem. Ber. 113, 2675–2685 (1980).
Herrmann et al., Journal of Organometallic Chemistry, 273 (1984) pp. 221–232.
Journal of Applied Polymer Science, vol. 7, pp. 347–355 (1963).
Miyaki et al., Angew. Chem. Internat. Ed. 8 (1969) pp. 520–521.
Renaut et al., Journal of Organometallic Chemistry, 150 (1978) C9–C10.
Journal of Organometallic Chemistry, 157 (1978) pp. 239–241.

*Primary Examiner*—Patrick P. Garvin
*Attorney, Agent, or Firm*—Brooks Haidt Haffner & Delahunty

[57] ABSTRACT

The present invention relates to an olefin polymerization catalyst obtainable by depositing on a dry inorganic oxide support a mononuclear chromium complex which is a mixture of (A) a first mononuclear chromium complex represented by the general formula:

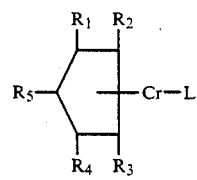

wherein
three of $R_1$ to $R_5$ are H and the other two are H, or $C_{1-3}$ hydrocarbyl group, and
L is one or more hydrocarbyl ligands which are sufficiently reactive to enable the complex to react with the inorganic oxide without thermal activation, and
(B) a second mononuclear chromium complex representable by the general formula

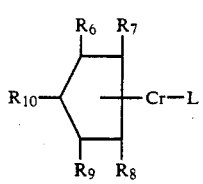

wherein
the cyclopentadienyl ligand is substituted with 4 or 5 hydrocarbyl groups (R1–R5) containing 1 to 3 carbon atoms, and
L has the same definition as above, being identical or different.

The catalyst can be used for polymerizing olefins, particularly ethylene optionally with $C_{3-8}$ alpha-olefins. It can be thermally activated before use in olefin polymerization. It produces polyolefins having a relatively broad molecular weight distribution, the breadth and shape of which being easily controlled.

11 Claims, No Drawings

CHROMIUM CONTAINING COMPLEX POLYMERIZATION CATALYST

The present invention relates to an olefin polymerisation catalyst, methods for producing the catalyst, a process for producing polyolefins using the catalyst and the polyolefins obtainable thereby.

The use of mononuclear chromium complexes for the polymerisation of olefins is known. For example, British Patent Specification 1253063 discloses a process for the polymerisation of ethylene comprising contacting ethylene, optionally in the presence of hydrogen, with a catalytic amount of bis(cyclopentadienyl) chromium (II) adsorbed on an inorganic oxide at a temperature and pressure sufficient to initiate the polymerisation reaction. US Patent 3806500 discloses a process for polymerising ethylene with a catalyst comprising a pi-bonded chromium compound (e.g. bis(cyclopentadienyl) chromium (II)) deposited on an activated support which catalyst is thermally aged before contacting with the ethylene by heating at a temperature of about 135° to 900° C. in an inert atmosphere for a period of time sufficient to allow for the removal of at least some of the ligands from the chromium compound. U.S. Pat. No. 3,844,975 discloses the homopolymerisation of ethylene or the copolymerisation of ethylene with other alpha-olefins using as a catalyst cyclopentadienyl chromium tricarbonyl hydride supported on an activated silica and/or alumina support, the catalyst being thermally aged in an inert atmosphere prior to contact with the monomer(s). In each of the patents it is suggested that the catalyst can comprise a substituted cyclopentadienyl ligand. However, none of the patents contains a specific example which utilises a compound containing a substituted cyclopentadienyl ligand.

The principal commercial catalyst systems used to prepare broad molecular weight distribution polyethylene suitable for extrusion applications are chromium oxide catalysts developed by Phillips Petroleum. These have several limitations in terms of the range of polymers that may be produced. In particular the polymer molecular weight is controlled by the polymerisation temperature used and the minimum molecular weight of the polymer that may be produced is constrained by the onset of polymer fouling at higher reactor temperatures. The molecular weight distribution of the polymers produced over these catalysts is typically broad and symmetrical and only limited control of the distribution is possible by varying the catalyst activation temperature.

It is of special interest to control the molecular weight distribution along with the molecular weight of the polymer beyond the bounds readily achieved with Phillips catalysts. Polymers with broad molecular weight distributions have good extrusion properties exhibiting a low viscosity at high shear rates and may also have improved stress crack resistance. Polymers of this type are useful for blow moulding and tough film grade applications.

Broad molecular weight distribution polymer may be produced commercially using cascade reactor systems in which two reactors are linked in series so that a two stage polymerisation can take place with different polymerisation conditions in each reactor. The catalysts according to the present invention will however produce polymer with a broad molecular weight distribution in a single reactor under steady reaction conditions.

It is also of interest for certain applications to produce polymer with a relatively broad molecular weight distribution but with a molecular weight lower than that readily achieved with Phillips catalysts (e.g. blow moulding extrusion milk bottles). The principal catalyst systems used commercially to produce lower molecular weight polyethylene are Ziegler catalysts. These catalysts generally produce polymer with a relatively narrow molecular weight distribution less suitable for extrusion applications. In addition polymers produced over these catalyst systems often have high levels of chlorine residues giving rise to corrosion in processing machinery. The catalyst systems according to the present invention may be halogen free. It is an objective of this invention to provide a flexible catalyst system allowing particularly sensitive control over breadth and shape of molecular weight distribution and over the molecular weight of the polymer produced which can be beyond the normal ranges achieved with Phillips and Ziegler commercial catalyst systems. According to the present invention an olefin polymerisation catalyst obtainable by depositing on a dry inorganic oxide support a mononuclear chromium complex and preferably so obtained, is characterised in that the mononuclear chromium complex is a mixture of:

(A) a first mononuclear chromium complex representable by the general formula:

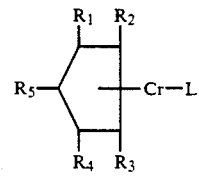

wherein three of $R_1$ to $R_5$ are H and the other two are individually H, methyl, ethyl, isopropyl or n-propyl and L is one or more hydrocarbyl ligand (depending on the coordination sites available on the chromium) which ligands are sufficiently reactive to enable the complex to react with the inorganic oxide without thermal activation and (B) a second mononuclear chromium complex representable by the general formula:

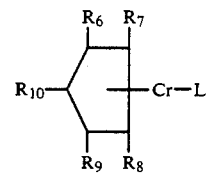

wherein four of the groups $R_6$ to $R_{10}$ of the substituted cyclopentadienyl ligand are individually selected from the group consisting of methyl, ethyl isopropyl and n-propyl and the fifth is selected from the group consisting of methyl, ethyl, n-propyl isopropyl and hydrogen and L is one or more hydrocarbyl ligand (depending on the coordination sites available on the chromium) which ligands are sufficiently reactive to enable the complex to react with the inorganic oxide without thermal activation.

In the mononuclear chromium complexes of the mixture, the hydrocarbyl ligand L must be sufficiently reactive to enable the complex to react with the inorganic oxide without thermal activation. Particularly, the complex is able to react with the inorganic oxide at a temperature lower than 100° C. and higher than about −30° C., preferably at a temperature from −20° C. to 50° C., e.g. at ambient temperature (20° C.), in an inert atmosphere. More particularly, the complex comprising such a hydrocarbyl ligand L may be capable of reacting with the hydroxyl groups existing in the inorganic oxide under these conditions. Preferably the hydrocarbyl ligand L is a labile group. Suitable reactive hydrocarbyl ligands L preferably include ligands which are sufficiently labile to enable the complex to react with the hydroxyl groups of the inorganic oxide, at a temperature higher than about −30° C., but lower than 100° C., preferably at a temperature from −20° C. to 50° C. If the complex comprising such a hydrocarbyl ligand L are not sufficiently labile or reactive with the inorganic oxide, the catalyst thus obtained without thermal activation may have a very low activity in olefin polymerisation and thermal activation will then be needed. The hydrocarbyl ligands L of the first (A) and second (B) mononuclear chromium complexes may be identical or different.

More particularly, a suitable reactive hydrocarbyl ligand L may be a hydrocarbyl ligand obtained by removal of H from LH which is an unsaturated hydrocarbon of 3 to 6 carbon atoms, or a substituted derivative thereof with one to three alkyl groups of 1 to 3 carbon atoms. The unsaturated hydrocarbon LH may be a conjugated or a non-conjugated diene hydrocarbon, such as pentadiene-1,3 or pentadiene-1,4. Preferably LH is a unsaturated hydrocarbon of 3 or 5 carbon atoms.

Suitable reactive hydrocarbyl ligands include, for example:
(a) cyclopentadienyl
(b) cyclopentadienyl substituted with one or two groups individually selected from methyl, ethyl, isopropyl and n-propyl
(c) pentadienyl
(d) pentadienyl substituted with hydrocarbyl groups containing e.g. from 1 to 6 carbon atoms, preferably substituted with up to three groups individually selected from methyl, ethyl, isopropyl and n-propyl such as 2, 4-dimethyl pentadienyl and 2-methyl-pentadienyl
(e) allyl and
(f) allyl substituted with hydrocarbyl groups containing e.g. from 1 to 6 carbons atoms, preferably substituted with up to three groups individually selected from methyl, ethyl, isopropyl and n-propyl.

The preferred reactive hydrocarbyl ligands L are: cyclopentadienyl, allyl, pentadienyl, 2,4-dimethyl-pentadienyl and 2-methyl-pentadienyl.

The first mononuclear chromium complex (A) represented by the above-mentioned formula preferably comprises an unsubstituted cyclopentadienyl ligand wherein the five groups $R_1$ to $R_5$ are hydrogen. The number of hydrocarbyl ligands L in the first mononuclear chromium complex (A) preferably is 1 or 2. The most preferred first mononuclear chromium complex (A) is bis(cyclopentadienyl) chromium (II). The second mononuclear chromium complex (B) represented by the above-mentioned formula preferably comprises a fully-substituted cyclopentadienyl ligand wherein the five groups $R_6$ to $R_{10}$ are selected from the group consisting of methyl, ethyl, isopropyl and n-propyl. The number of hydrocarbon ligands L in the second mononuclear chromium complex (B) preferably is 1 or 2. The most preferred second mononuclear chromium complexes (B) are:
(pentamethylcyclopentadienyl)(cyclopentadienyl)-chromium (II),
(pentamethylcyclopentadienyl)(pentadienyl)chromium (II),
(pentamethylcyclopentadienyl)(allyl)chromium (II),
(pentamethylcyclopentadienyl)(2-methylpentadienyl) chromium (II),
(pentamethylcyclopentadienyl)(2,4-dimethylpentadienyl)chromium (II).

Mononuclear chromium complexes suitable for use in the present invention are known and can be prepared by known methods. Any novel complexes embraced by the above mentioned general formula can be prepared by methods analogous to known methods.

In situ preparations of the catalyst precursors in which at least one of the mononuclear chromium complexes is formed in solution and deposited directly onto the inorganic oxide support advantageously reduces the number of process steps required to prepare the catalyst.

Any suitable inorganic oxide can be used to support the mononuclear chromium complexes including, for example, silica, alumina, silica-alumina mixtures, thoria, zirconia, magnesia, titania and mixtures thereof. Preferably, the inorganic oxide comprises a major amount of silica. More preferably, the inorganic oxide comprises at least 80% by weight of silica.

The particle size of the inorganic oxide support is not considered to be particularly critical, but the inorganic oxide preferably has a relatively high surface area. The surface area of the inorganic oxide is preferably greater than 20 $m^2g^{-1}$, more preferably from 50 to 1000 $m^2g^{-1}$.

The mononuclear chromium complexes are sensitive to moisture and so the inorganic oxide used to support the complex should be dry. The inorganic oxide can be dried simply by heating the oxide in a dry, inert atmosphere. The drying may be carried out at any temperature up to the temperature at which the oxide begins to sinter for a period of time which is at least sufficient to remove the physically adsorbed water. Typically, the drying may be carried out at a temperature of from 200° to 1000° C. for a period of from 6 to 36 hours. Preferably, the temperature used is at least 300° C., more preferably at least 500° C., but is preferably less than 900° C. A suitable inert atmosphere can be provided, for example by carrying out the heating under a blanket of an inert gas such as nitrogen or argon. Preferably, the inert gas is passed through the inorganic oxide during the drying to assist in displacing the water.

The melt index of the polymer produced using the supported catalyst may be affected by the selection of the type and grade of inorganic oxide. The temperature at which the inorganic oxide is dried may have an effect on the relative productivity of the catalyst system and on the molecular weight distribution and melt index of the polymer produced.

The catalyst according to the present invention can be prepared by depositing the first mononuclear chromium complex (A) and the second mononuclear chromium complex (B) onto the inorganic oxide simultaneously or sequentially.

The mononuclear chromium complexes may be deposited on the dry inorganic oxide using known techniques for the preparation of supported catalysts. For example, a slurry technique can be used in which the inorganic oxide is contacted with a solution of the complex under conditions which exclude air and water. The slurry can be stirred for a period of time sufficient to achieve good adsorption of the mononuclear chromium complex on the inorganic oxide support e.g. up to about 4 hours. Any suitable dry solvent may be used such as for example petroleum ether.

The supported catalyst may be used in the form of a slurry or paste. However, the solvent is preferably removed, e.g. by filtration or evaporation in a dry, inert atmosphere to produce a dry free-flowing powder.

Direct vapour deposition may also be used in some cases to deposit the mononuclear chromium complex on the inorganic oxide. This may conveniently be carried out by blending the complex and the inorganic oxide in a dry, inert atmosphere and then reducing the pressure to cause the mononuclear chromium complex to sublime and adsorb onto the inorganic oxide support.

Preferably the catalysts according to the present invention are prepared by simultaneously depositing the first (A) and second (B) mononuclear chromium complexes onto the inorganic oxide from a solution containing both complexes.

The mixture of the first (A) and second (B) mononuclear chromium complexes deposited onto the inorganic oxide may be such that the ratio by weight of chromium of (A) to chromium of (B) is from 95:5 to 5:95, preferably from 80,20 to 20:80, and most preferably from 70,30 to 30:70. It has been surprisingly observed that the mixture of the two mononuclear chromium complexes in the catalyst of the present invention produces a synergistic effect on the molecular weight distribution of the polyolefins produced. More particularly, when the ratio by weight of chromium of (A) to chromium of (B) decreases in the mixture used for preparing the catalyst, the molecular weight and the melt index ratio of the polyethylene produced progressively increase, while the molecular weight distribution initially increases, then reaches a maximum value and finally decreases.

Typically, the amount of the mononuclear chromium complexes deposited on the inorganic oxide support is such that the amount of chromium is from 0.01 to 10% by weight of the total weight of the complex and inorganic oxide. Preferably, the supported catalyst contains from 0.1 to 5% more preferably from 1 to 3% by weight of chromium. Mixtures comprising more than one of the first and/or second of mononuclear chromium complexes can be used.

It is an advantageous feature of the catalysts according to the present invention that they need not be thermally activated before use. A thermal activation is generally considered as an expensive stage and as a source of irreproducibility of the catalyst. Therefore, the omission of a thermal activation in the preparation of the present catalyst advantageously leads to a highly reproducible catalyst. However, the catalyst may be thermally activated before use in olefin polymerisation. The thermal activation comprises heating the supported catalyst at a temperature preferably less than 700° C. for a period of at least 5 mins, preferably 10 mins to 24 hours. Preferably, the activation is carried out at a temperature of from 100° to 350° C. The thermal activation should be carried out in a dry, inert atmosphere, more particularly in a non-oxidizing atmosphere, free from moisture and oxygen, e.g. under nitrogen, argon or vacuum.

The present invention includes a process for the production of polyolefins, in particular homopolymers of ethylene and copolymers of ethylene with minor amounts of at least one $C_3$ to $C_8$ alpha-olefin, which process comprises contacting the monomer or monomers, optionally in the presence of hydrogen, with an olefin polymerisation catalyst according to the present invention and as hereinbefore defined at a temperature and pressure sufficient to initiate the polymerisation reaction. The polymers or copolymers of ethylene thus obtained generally have a density of 950 to 970 kg/m$^3$, and the $C_3$ to $C_8$ alpha-olefin content in the copolymers of ethylene can be about from 0.01% to 5% by weight.

The supported olefin polymerisation catalysts according to the present invention may optionally be used in the presence of one or more organo metallic co-catalyst compounds having a metal belonging to the Groups I to III of the Periodic Table of the elements, the metal being selected e.g. amongst lithium, magnesium, zinc, aluminium and boron. Such co-catalysts are known for use in the polymerisation of olefins and particularly include organo-aluminium compounds, for example, trimethylaluminium, triethylaluminium, diethylaluminium hydride, triisobutyl aluminium, tridecylaluminium, tridodecylaluminium, diethylaluminium methoxide, diethylaluminium ethoxide, diethylaluminium phenoxide, diethyl aluminium chloride, ethyl aluminium dichloride and methyl diethoxy aluminium. The co-catalyst can be deposited on the supported catalyst before, during or after the addition of the mononuclear chromium complexes or can be added to the polymerisation medium along with the catalyst. Preferably the amount of co-catalyst used is up to 1000 mols of metal per mol of chromium in the mononuclear chromium complexes of the supported catalyst. More preferably the amount of co-catalyst used is less than 100 most preferably less than 10 mols of metal per mol of chromium.

The olefin polymerisation catalyst according to the present invention can be used to produce polymers using solution polymerisation, slurry polymerisation or gas phase polymerisation techniques. Methods and apparatus for effecting such polymerisation reactions are well known. The catalyst according to the present invention can be used in similar amounts and under similar conditions to known olefin polymerisation catalysts such as for example the chromocene catalysts or supported chromium oxide catalysts.

The polymerisation is effected by contacting the monomer(s) with a catalytically effective amount of the olefin polymerisation catalyst according to the present invention, in the substantial absence of catalyst poisons, optionally in the presence of hydrogen at a temperature and pressure which are sufficient to initiate polymerisation.

Typically, the temperature is from 30° to 110° C. for the conventional slurry or "particle form" process and the gas phase process. For the solution process the temperature is typically from 100° to 200° C. The pressure used can be selected from a relatively wide range of suitable pressures e.g. from subatmospheric to about 350 MPa (50,000 psi). Generally, the pressure is from atmospheric up to about 6.9 MPa, preferably from 0.14 to 5.5 MPa.

The present invention also includes polymers obtainable by a process using a catalyst according to the present invention.

METHOD FOR MEASURING THE MOLECULAR WEIGHT DISTRIBUTION

The molecular weight distribution of a (co)polymer is calculated according to the ratio of the weight-average molecular weight, Mw, to the number-average molecular weight, Mn, of the (co)polymer, from a molecular weight distribution curve obtained by means of a "WATERS" (trademark) model "150C" gel permeation chromatograph (High Temperature Size Exclusion Chromotograph), the operation conditions being the following:

solvent: 1,2,4-trichlorobenzene;
solvent flow rate: 1.0 ml/minute;
three "SHODEX" (trademark) model "At 80 MS" columns of 25 cm of length are employed;
temperature: 145° C.;
Sample concentration: 0.1% by weight;
injection volume: 500 microlitres;
universal standardisation using monodispersed polystyrene fractions.

The invention is illustrated by the following example and comparative examples. All the catalysts of the Examples were prepared and stored under conditions which excluded air and water.

EXAMPLE 1

Preparation of (Pentamethyl Cyclopentadienyl) (2-Methyl Pentadienyl)Chromium (II) [Cr($C_5(CH_3)_5$)($C_6H_9$)]

A 2 liter 3-necked flask was fitted with a nitrogen stopcock adaptor and an overhead stirrer. The vessel was then purged with nitrogen and charged with 800 cm$^3$ of dry degassed 40-60 petroleum ether. To this was added pentamethylcyclopentadiene (60 cm$^3$, 60 g, 441 mmol, purchased from Aldrich) followed by butyl lithium (176 cm$^3$, 441 mmol, 2.5M in hexanes purchased from Aldrich). A reflux condenser connected to the nitrogen supply was then fitted to the third neck of the flask. The vessel was then placed in a silicone oil bath and the reaction refluxed for 5 h during which time a white precipitate of pentamethyl cyclopentadienyl lithium [$L_i$ $C_5(CH_3)_5$] formed. The solid was then left to settle and the supernatant liquor decanted off using a siphon technique. The product was then washed with 3×500 cm$^3$ 40-60 petroleum ether. Yield=58 g, 93%. The materials was highly air sensitive, and pyrophoric, and was stored under nitrogen.

A 1 liter 3-necked flask purged with nitrogen was charged with CrCl$_2$ (9.9g, 80 mmol, purchased from Aldrich) and a magnetic stirrer bar. A powder addition funnel under an atmosphere of nitrogen was charged with [Li $C_5$ (CH$_3$)$_5$] (11.4 g, 80 mmol) and the funnel then connected to the 3-necked flask, the whole operation carried out under nitrogen. Freshly distilled tetrahydrofuran (THF) (250 cm$^3$) was then added to the 1.0 liter flask and the CrCl$_2$ stirred to break up the solid mass into a slurry. The slurry was then cooled to −40° to −50° C. (monitored by a thermometer in the reaction mixture) using a dry ice isopropanol bath. [Li $C_5(CH_3)_5$] was then added slowly over 30 minutes to the tetrahydrofuran slurry. The slurry turned from light green through blue to purple at the end of the addition. The reaction mixture was then allowed to warm slowly to room temperature over 1.5 hours; over which time the reaction mixture turned from a purple slurry to a purple black solution.

A 3-necked 250 cm$^3$ flask purged with nitrogen was charged with THF (130 cm$^3$) followed by 2-methyl-1,4-pentadiene (15.7 cm$^3$, 10.9 g, 133 mmol). The solution was then cooled to 0° C. and butyl lithium (53.6 cm$^3$ 133 mmol, 2.5M in hexanes, ex Aldrich) was added via a syringe. This was stirred for 30 minutes at 0° C. during which time the colour changed from yellow to orange.

The orange solution of 2-methyl pentadienyl lithium [Li $C_6H_9$] was then transferred to a powder addition funnel, under an atmosphere of nitrogen connected to a reaction vessel containing the [Li $C_5(CH_3)_5$ [CrCl$_2$] reaction product (133 mmol based on CrCl$_2$) in THF solution prepared as described above. The THF solution of the chromium pentamethylcyclopentadienyl complex was then cooled to −30° to −40° C. The [Li $C_6H_9$] solution was then introduced into the reaction vessel and became dark brown. The solution was then allowed to warm up to 10° C. at which temperature the solvent was removed under vacuum until a dry residue was obtained.

The residue from the above reaction was extracted with 2×200 cm$^3$ followed by 2×50 cm$^3$ of 40-60 petroleum ether and the extracts filtered through a number 3 sintered glass disc. The volume of filtered extracts was then reduced to 80 cm$^3$. The concentrated solution was then allowed to crystallise at −20° C. for 2 h. A dark brown crystalline material was isolated 19.4 g, 54% yield of (pentamethylcyclopentadienyl)(2-methyl pentadienyl) chromium (II) [Cr($C_5(CH_3)_5$)($C_6H_9$).

Catalyst Preparation

A commercially available silica sold by Joseph Crosfield and Sons Ltd under the trade designation EP10 was dehydrated at 150° C. in a vacuum oven. The silica was then heated at a temperature of 800° C. for 24 hours in an oven through which was passed a stream of dry nitrogen. The silica had a surface area of about 280m/g. 10 g of the heat treated silica was placed in a 3-necked round bottomed flask, still under an atmosphere of dry nitrogen. 0.35 g of bis(cyclopentadienyl) chromium (II) and 0.52g of [Cr ($C_5(CH_3)_5$)($C_6H_9$)] were dissolved in 40 cm$^3$ of 40-60 petroleum ether. The solution was introduced into the three-necked flask using a syringe. The slurry was stirred and the solvent removed under vacuum to produce free flowing particles. The molar ratio of the two mononuclear chromium complexes was 1:1. The catalyst contained approximately 2% by weight of chromium.

Polymerization of Ethylene

Ethylene was homopolymerized in a 2.3 liter stainless steel reactor by contacting the monomer with the catalyst in 1.0 liter of isobutane at 90° C. under a total pressure of 3.5 MPa for approximately 80 minutes. The hydrogen pressure used was about 0.1 MPa. The weight of catalyst used was 0.08 g. Details of the polymerization and the polymer produced are given in the Table.

EXAMPLE 2

Catalyst Preparation

The catalyst was prepared substantially as described in Example 1 except that the silica was treated with a 40-60 petroleum ether solution containing 0.238 of bis (cyclopentadienyl) chromium (II) and 0.68 g of [Cr($C_5(CH_3)_5$)($C_6H_9$)] to give a 1:2 molar ratio of the two complexes. The final catalyst contained approximately 2 wt. % of chromium.

Ethylene Polymerization

The polymerization reaction was carried out as described in Example 1. 0.08 g of catalyst was used and the polymerization was run for approximately 90 minutes.

Details of the polymerization process and the polymer produced are given in the Table.

COMPARATIVE EXAMPLE A

Catalyst Preparation

A catalyst was prepared substantially as described in Example 1 except that instead of the mixture of mononuclear chromium complexes, the silica was treated with 0.78 of bis (cyclopentadienyl) chromium (II) dissolved in 40cm$^3$ of 40-60 petroleum ether.

Polymerization of Ethylene

Ethylene was homopolymerized substantially as described in Example 1.

Details of the polymerization process and the polymer produced are given in the Table.

COMPARATIVE EXAMPLE B

Catalyst Preparation

The catalyst was prepared as described in Example 1 except that instead of the mixture of mononuclear chromium complexes, the silica was treated with a 40-60 petroleum ether solution containing 1 g of [Cr(C$_5$(CH$_3$)$_5$)(C$_6$H$_9$)]. The final catalyst contained approximately 2 wt. % of chromium.

Ethylene Polymerization

As in Example 1, except that 0.088 of the above catalyst was used and the polymerization was run for approximately 60 minutes.

TABLE

Polymerization Data for Mixed Catalyst Systems containing Different Porportions of [Cr(C$_5$H$_5$)$_2$] and (Cr(C$_5$(CH$_3$)$_5$)(C$_6$H$_9$)) impregnated onto silica

| Example No | Catalyst A:B | Polymerization Prod. g/g | Polymerization Act. g/gh | Polymer MI$_{2.16}$$^a$ | Polymer MIR$^b$ | Polymer Density kg/m3 | GPC M$_w$ | GPC M$_n$ | GPC M$_w$/M$_n$ |
|---|---|---|---|---|---|---|---|---|---|
| A | 2:0 | 2533 | 1948 | 122 | 29.5 | 967 | 25,200 | 7,980 | 3.16 |
| 1 | 1:1 | 3645 | 3527 | 8.0 | 43.9 | 963 | 72,400 | 13,000 | 5.58 |
| 2 | 1:2 | 2859 | 1927 | 1.8 | 47 | 961 | 107,000 | 15,800 | 6.77 |
| B | 0:2 | 2562 | 2562 | 0.15 | 66.0 | 957 | 164,000 | 28,700 | 5.71 |

Notes
A = [Cr(C$_5$H$_5$)$_2$] B = [Cr(C$_5$(CH$_3$)$_5$)(C$_6$H$_9$)] ratio quoted refers to wt % chromium.
$^a$melt index according to ASTM D 1238 Condition E
$^b$melt index ratio = $\frac{\text{Melt Index according to ASTM D 1238 (Condition F)}}{\text{Melt Index according to ASTM D 1238 (Condition E)}}$

I claim:

1. An olefin polymerization catalyst obtainable by depositing on a a dry inorganic oxide a mononuclear chromium complex characterised in that the mononuclear chromium complex is a mixture of:
   (A) a first mononuclear chromium complex representable by the general formula:

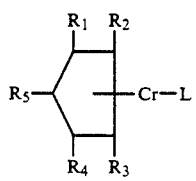

wherein three of R$_1$ to R$_5$ are H and the other two are individually H, methyl, ethyl, isopropyl or n-propyl and L is one or more hydrocarbyl ligand (depending on the coordination sites available on the chromium) which ligands are sufficiently reactive to enable the complex to react with the inorganic oxide without thermal activation and (B) a second mononuclear chromium complex representable by the general formula:

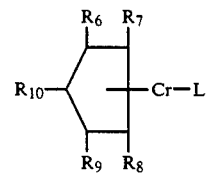

wherein four of the groups R$_6$ to R$_{10}$ of the substituted cyclopentadienyl ligand are individually selected from the group consisting of methyl, ethyl, isopropyl and n-propyl and the fifth is selected from the group consisting of methyl, ethyl, n-propyl isopropyl and hydrogen and L is one or more hydrocarbyl ligands having the same definition as above, the hydrocarbyl ligands L of the first (A) and second (B) mononuclear chromium complexes being identical or different.

2. A catalyst as claimed in claim 1 in which the reactive hydrocarbyl ligand of the first and/or second mononuclear chromium complex is selected from the group consisting of:
   (a) cyclopentadienyl,
   (b) cyclopentadienyl substituted with one or two groups individually selected from methyl, ethyl, isopropyl and n-propyl,
   (c) pentadienyl,
   (d) pentadienyl, substituted with a hydrocarbyl group containing from 1 to 6 carbon atoms
   (e) allyl and
   (f) allyl substituted with a hydrocarbyl group containing from 1 to 6 carbon atoms.

3. A catalyst as claimed in claim 2 in which the reactive hydrocarbyl ligand L is substituted pentadienyl or substituted allyl either of which is substituted with up to three groups individually selected from methyl, ethyl, isopropyl and n-propyl.

4. A catalyst as claimed in claim 2 in which the reactive hydrocarbyl ligand L is selected from the group consisting of cyclopentadienyl, allyl, 2,4-dimethyl-pentadienyl, 2-methylpentadienyl and pentadienyl.

5. A catalyst as claimed in claim 1, 2, 3 or 4 in which the mixture of the first (A) and second (B) mononuclear chromium complexes deposited onto the inorganic oxide is such that the ratio by weight of chromium of (A) to chromium of (B) is from 95:5 to 5:95.

6. A catalyst as claimed in claim 1, 2, 3 or 4 in which the amount of chromium deposited on the inorganic oxide is from 0.01 to 10% by weight of the total weight of the complex and inorganic oxide.

7. A catalyst as claimed in claim 1, 2, 3 or 4 in which the catalyst has been thermally activated by heating at a temperature of 100° C. to 350° C. in a dry inert atmosphere.

8. A process for producing a catalyst as claimed in claim 1, in which the first (A) and second (B) mononuclear chromium complexes are simultaneously or sequentially deposited on the same inorganic oxide.

9. An olefin polymerization catalyst as claimed in claim 1 wherein in the first mononuclear chromium complex (A) the reactive ligand L is cyclopentadienyl and $R_1$ through $R_5$ are hydrogen, and wherein in the second mononuclear chromium complex (B) each of $R_6$ through $R_{10}$ is methyl and L is 2-methylpentadienyl.

10. A catalyst as defined in claim 9 wherein the mixture of the first (A) and second (B) mononuclear chromium complexes deposited onto the inorganic oxide is such that the ratio by weight of chromium (A) to chromium of (B) is from 95:5 to 5:95.

11. A catalyst as defined in claim 10 in which the amount of chromium deposited in the inorganic oxide is from 0.01 to 10% by weight of the total weight of the complex and inorganic oxide and the catalyst has been thermally activated by heating at a temperature of 100° to 350° C. in a dry inert atmosphere.

* * * * *

UNITED STATES PATENT AND TRADEMARK OFFICE
CERTIFICATE OF CORRECTION

PATENT NO. : 5,169,816
DATED : December 8, 1992
INVENTOR(S) : Gordon M. Dawkins

It is certified that error appears in the above-indentified patent and that said Letters Patent is hereby corrected as shown below:

On the Title page, item [57]col. 2, in the Abstract, both formulas should have an interrupted circle in the center of the cyclopentadienyl ligand
Column 2, line 14, "It is an objective of" should start a new paragraph
Column 2, line 20, "According to the present" should start a new paragraph
Column 2, lines 30 & 35, in both drawings there should be a circle
Column 5, line 29, should read "from 80:20"
Column 7, line 15, should read "model "AT 80 MS"
Column 8, line 29, formula should have a bracket (]) at the end
Column 8, line 64, should read "containing 0.23g
Column 8, line 66, formula should have a bracket (]) at the end
Column 9, line 14, should read "with 0.7g of bis"
Column 9, line 34, should read "except that 0.08g of the"
Column 10, claim 1, line 25, there should be a comma (,) after "npropyl,"

Signed and Sealed this

Ninth Day of November, 1993

Attest:

BRUCE LEHMAN

*Attesting Officer*      *Commissioner of Patents and Trademarks*